United States Patent [19]
Katagiri et al.

[11] Patent Number: 5,973,432
[45] Date of Patent: Oct. 26, 1999

[54] MOTOR HAVING MAGNETIC SLOT CLOSURE FOR SALIENT POLES

[75] Inventors: Masayuki Katagiri; Kazutaka Kobayashi, both of Nagano, Japan

[73] Assignee: Kabushiki Kaisha Sankyo Seiki Seisakusho, Nagano, Japan

[21] Appl. No.: 08/985,203

[22] Filed: Dec. 4, 1997

[30] Foreign Application Priority Data

Dec. 4, 1996 [JP] Japan .................................. 8-337667

[51] Int. Cl.⁶ .................................................. H02K 3/48
[52] U.S. Cl. ........................... 310/214; 310/269; 29/596; 29/598
[58] Field of Search ................ 310/269, 49 R, 310/216, 218, 259, 51, 214, 215; 29/596, 598

[56] References Cited

U.S. PATENT DOCUMENTS

| 3,468,019 | 9/1969 | Brown et al. ........................... 310/214 |
| 3,940,647 | 2/1976 | Keuper et al. .......................... 310/214 |
| 4,274,027 | 6/1981 | Higuchi et al. ......................... 310/269 |
| 4,433,262 | 2/1984 | Grenlee ................................... 310/214 |
| 4,933,584 | 6/1990 | Harms et al. ........................... 310/162 |
| 5,036,258 | 7/1991 | Tajima .................................... 310/214 |
| 5,220,228 | 6/1993 | Sibata ..................................... 310/254 |
| 5,250,867 | 10/1993 | Gizaw .................................... 310/179 |
| 5,252,877 | 10/1993 | Sawa et al. ............................. 310/214 |
| 5,258,681 | 11/1993 | Hibino et al. .......................... 310/214 |

FOREIGN PATENT DOCUMENTS 6-88178  12/1994  Japan .............................. H02K 23/04

Primary Examiner—Thomas M. Dougherty
Assistant Examiner—Tran N Nguyen
Attorney, Agent, or Firm—Sughrue, Mion, Zinn, Macpeak & Seas, PLLC

[57] ABSTRACT

After a coil 24 is wound through an open slot 26 which forms a sufficient space for the winding operation of an armature core 10, a magnetic member 34 is inserted and mounted into the open slot 26 and is then engaged with and fixed to the umbrella portions 20 of the armature core 10. A gap 36 formed in the central portion of the open slot 26 operates to narrow a gap between the magnetic poles of mutually adjoining salient poles 16, which reduces not only the generation of cogging phenomena and vibrations but also variations in quality between products, that is, the armature cores 10 produced.

15 Claims, 6 Drawing Sheets

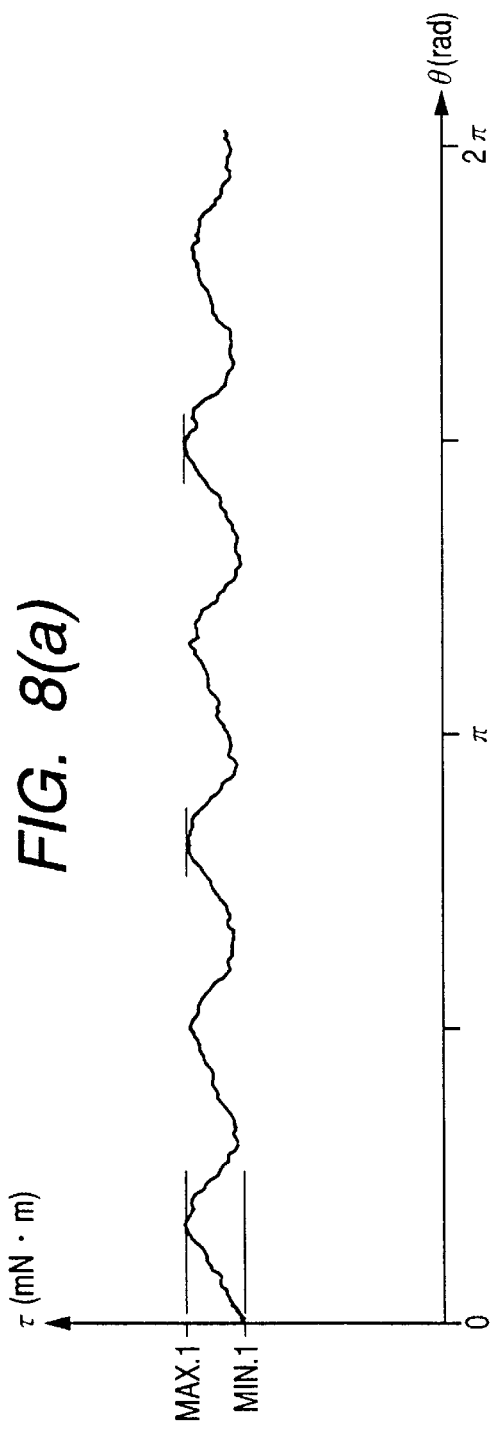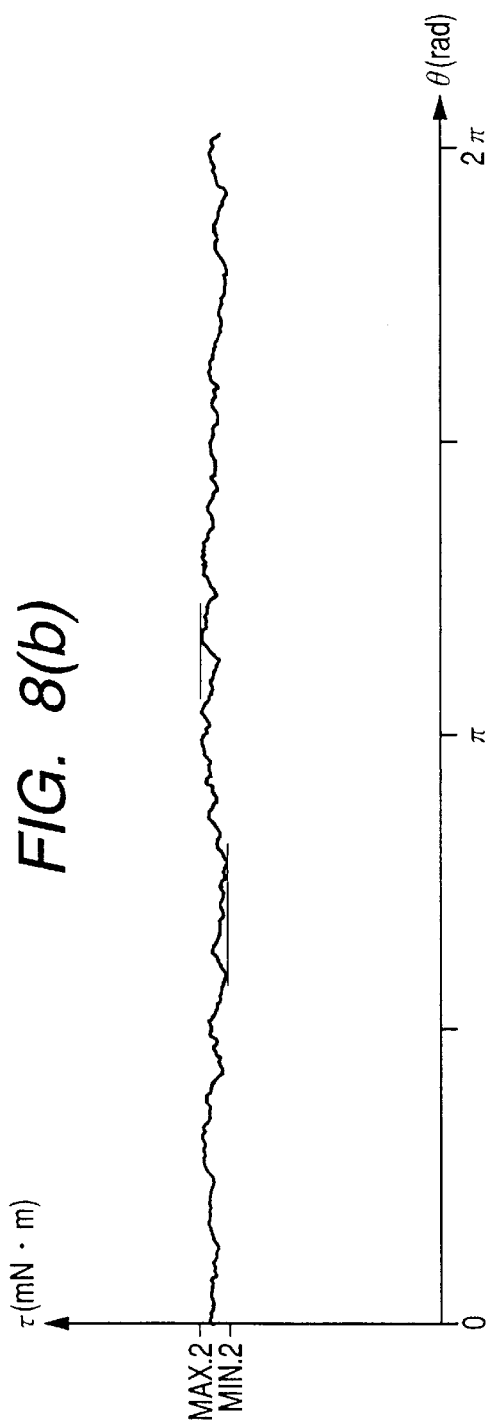

MOTOR HAVING MAGNETIC SLOT CLOSURE FOR SALIENT POLES

BACKGROUND OF THE INVENTION

1. Field of the invention

The present invention relates to an armature core for use in a motor and, in more particular, to a magnetic treating means for treating magnetic flux in an open slot formed between mutually adjoining salient poles provided in the armature core.

2. Related art

As shown in FIG. 10, a conventional armature core 110 comprises a plurality of, for example, three salient poles 116 which are respectively disposed at uniform intervals from each other and are projected radially from the central portion 118 of the armature core 110, while each of the salient poles 116 includes an arm portion 112 and an umbrella portion 114. And, between the mutually adjoining umbrella portions 114 of the salient poles 116, there is formed an open slot 120 which extends in the peripheral direction of the armature core 110 to provide a space necessary for a winding operation to wind a coil 122 around the arm portion 112 of the salient pole 116.

Referring to the coil winding operation, as shown in FIG. 10, while guiding a lead wire 124, the armature core 110 is rotated (in the direction of an arrow A shown in FIG. 10) around a nozzle 126 from which the lead wire 124 is played out, so that the lead wire 124 is wound around the arm portion 112 of the armature core 110. The open slot 120 forms an operation space in order to prevent the umbrella portion 114 from interfering with the winding operation, while the nozzle 126 which is moved in a controlled manner forms the coil 122. The coil 122 can be wound by the nozzle 126 around the arm portion 112 but only in the range that is shown by reference character δ. Part of the inside portion of the umbrella portion 114 is filled up with the winding collapsed portion of the coil 122 that is produced in the end portion thereof, but the remaining portions thereof are left as a dead space 128.

On the other hand, the distance of the opening 130 of the open slots 120 formed between the mutually adjoining umbrella portions 114 causes a change in the magnetic resistance due to the angle of rotation of the motor, which in turn provides a factor in a cogging due to Maxwell stress which is in proportion to the square of a magnetic flux density, thereby obstructing the smooth continuous rotation of the motor.

That is, in order to facilitate the winding operation of the coil, if the gap of the opening 130 of the open slot 120 is widened too much, then the magnetism of the present portion decreases, so that the magnetic resistance increases to thereby increase the cogging. On the other hand, if the width or gap of the opening 130 is narrowed, then the winding operation of the coil 120 becomes difficult, which not only lowers the productivity of the coil 120 but also reduces the occupation rate of the volume of the coil 120 to thereby make it impossible to obtain a required motor output.

In order to solve the above problems, in Unexamined Japanese Utility Model Publication Hei. 6-88178, an additional core is provided in the adjoining space (open slot) formed between the salient poles after completion of the coil winding operation. However, according to this proposal, because the structure of the armature core is complicated to a certain degree, the cost thereof is caused to increase. Also, there is a possibility that a magnetic path can short-circuit between the mutually adjoining umbrella portions to thereby deteriorate the efficiency of the motor.

SUMMARY OF THE INVENTION

In view of the above, it is an object of the invention to provide a motor in which, by use of simple means, not only a coil winding operation can be executed effectively and positively but also the magnetism collecting function thereof can be enhanced to thereby prevent the occurrence of the cogging, so that the motor itself can be rotated smoothly.

According to the present invention, a motor, comprises an armature core including a plurality of salient poles and a plurality of open slots respectively formed between the mutually adjoining ones of said salient poles, each of said salient poles including an arm portion projecting radially from the central portion of said armature core and an umbrella portion formed at the distal end portion of said arm portion and extending to the both sides of its circumferential direction; a coil wound around said arm portion of each of said salient poles; a plurality of field magnets opposed to the outer peripheral surface of said umbrella portion; a magnetic member including a magnetism collecting surfarce containing therein a magnetism collecting surface corresponding to the extension portion of said outer peripheral surface of said umbrella portion; and an opening formed in the central portion of said magnetism collecting surface, wherein said magnetic member is inserted into said open slot, and wherein one of said armature core and said field magnet can be rotated with respect to the other.

As has been described hereinbefore, with use of a motor according to the invention, since the magnetic member is mounted into the open slot to thereby narrow the substantial gap between the salient poles, the cogging and vibrations can be reduced.

Also, in the gap portion which is formed in the central portion of the present magnetic member, the magnetism collecting surfarces on the two sides of the present gap portion are bridgingly connected together to thereby complete a magnetic circuit, so that the short circuit of the magnetic circuit can be restricted and thus the lowering of the motor efficiency can be prevented. Further, since the open slot can be widened in the armature core before the magnetic member is mounted into the armature core, the coil winding control range can be expanded, so that the occupation rate of the volume of the coil wound is enhanced and thus the motor efficiency can be improved.

Still further, according to the motor of the invention, since the uneven quality of the products with respect to vibrations can be reduced, it is easy to select the property of the motor with respect to other peripheral members such as an anti-vibration member and the like which can be combined with the motor as the need arises.

BRIEF DESCRIPTION OF THE DRAWINGS

FIG. 8 is graphical representations of the results that are obtained in the form of measured torque variations when a motor according to the invention with a magnetic member mounted thereinto is compared with a conventional motor, in particular, FIG. 8 (a) is a graphical representation of the measured torque variations of the conventional motor, and FIG. 8 (b) is a graphical representation of the measured torque variations of the motor according to the invention with a magnetic member mounted thereinto;

DETAILED DESCRIPTION OF THE PREFERRED EMBODIMENTS

Figure 1:
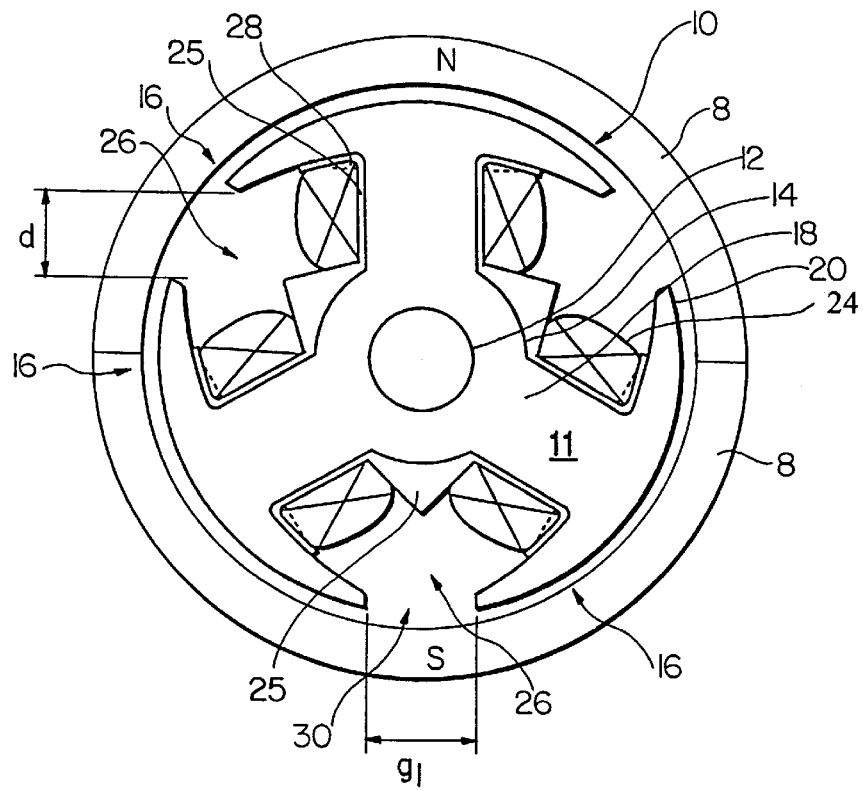
FIG. 1 is a plan view of an armature core of a motor according to the invention, showing a state thereof before a magnetic member is mounted into an open slot formed therein.

Now, description will be given below of an embodiment of a motor according to the invention with reference to the accompanying drawings. In particular, FIG. 1 is a plan view of an armature core 10 employed in a motor according to the invention, showing a state thereof before a magnetic member is mounted into an open slot 26 formed in the armature core 10 employed in the motor according to the invention. In FIG. 1, reference character 12 designates a rotary shaft. The armature core 10 can be produced by piling up a plurality of high permeability magnetic plates 11 (each of which is hereinafter referred to as a magnetic plate) in phase with each other along the rotary shaft 12 in the outer periphery of a center member 14 of the armature core 10, while the magnetic plates 11 are identical in shape with each other and each of them includes a plurality of, for example, as shown in FIG. 1, three salient poles 16 which are projected radially at uniform intervals. Also, a plurality of field magnets 8 are provided.

Each of the salient poles 16 comprises an arm portion 18 and an umbrella portion 20, while a lead wire is wound around the arm portion 18 to thereby form a coil 24. The respective coils 24 are connected to a commutator (not shown) and they are star connected or delta connected to each other. Reference character 25 stands for an electric insulator.

Between the mutually adjoining salient poles 16, there is formed an open slot 26. In particular, the open slot 26 provides a space which not only facilitates the winding operation of the coil 24 but also secures the independence of magnetic poles to be generated in the respective salient poles 16 due to the conduction currents of the respective coils 24. Also, because the occupation rate of the volume of the wound coil must be increased in order to enhance the output of the motor within the limited volume thereof, it is desirable to set a dead space 28 as small as possible.

If the winding wire or coil control range d of the open slot 26 is widened, then the dead space 28 is reduced, which, of course, enhances the occupation rate of the volume of the coil to thereby be able increase the output of the motor. However, the spread of the coil control range d incurs an increase in the distance $g_1$ of an opening 30 in the open slot 26, decreases the magnetism collecting force thereof, and causes a discontinuous portion in the rotation torque of the salient pole 16 due to the mutual action between a magnetic flux and a coil current to thereby provide a factor in the cogging.

By the way, an armature core 10 was formed in such a manner that it includes a sufficient coil control range d which not only facilitates the coil winding operation but also can reduce the dead space 28, and a motor was composed of the thus structured armature 10. Such motor was rotated once and the variations of the rotation torque of the motor were measured. The results of such measurement are shown by a graphical representation in FIG. 8 (a). In particular, in this graphical representation, coggings at six positions corresponding to the magnetic poles are measured as the variations of the motor rotation torque.

In this graphical representation, a horizontal axis expresses a rotation angle θ and a vertical axis expresses a torque τ. In this case, an absolute value $|\Delta \tau_1|$ of a difference between the torque maximum value $\tau_{max.1}$ and the torque minimum value $\tau_{min.1}$ is 0.36 mN• m (mili-newton• meter).

In attaining the object of the invention, in order that, after the coil is wound at a good occupation rate of the volume thereof according to the coil winding control range of the open slot 26 suitable for the coil winding operation, the above variations of the motor rotation torque can be reduced and the motor can be thereby rotated smoothly, in the gap $g_1$ of an opening 30 formed between the mutually adjoining umbrella portions 20 each having a large magnetic resistance, there is provided means which can be used to increase a magnetism collecting force.

Figure 2:
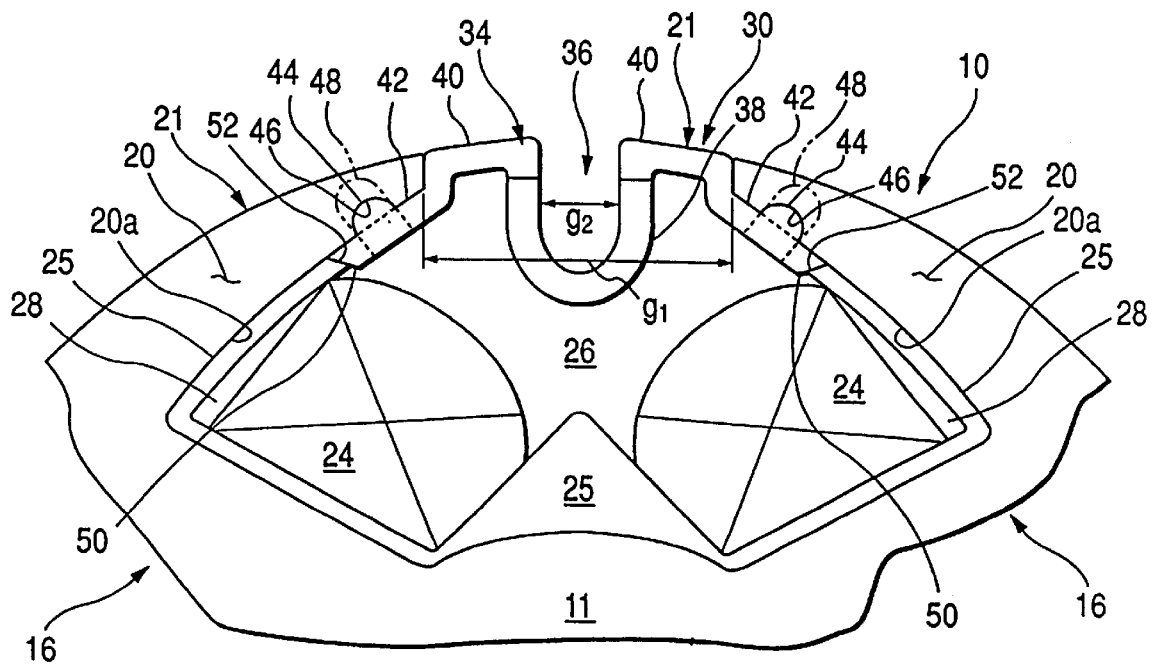
FIG. 2 is a plan view of the armature core of the motor according to the invention, showing a state thereof in an enlarged manner in which a magnetic member is mounted into one of open slots formed therein.

In particular, in the open slot 26 of the motor armature core 10 according to the invention, as shown in FIG. 2 which is an enlarged view of the open slot 26, after completion of the winding operation of the coil 24, a magnetic member 34 is inserted into an opening 30 formed in the open slot 26 and is engaged with the inner surface 20a of the umbrella portion 20, thereby fixing the magnetic member 34 to the inner surface 20a. This can increase generally the magnetism collecting force at the portion of the gap $g_1$ of the opening 30 to thereby enhance the efficiency of the motor rotation.

The magnetic member 34 includes in the center portion thereof a curved portion 38 to thereby form a gap portion 36 used as an opening which is open outwardly in the radial direction of the open slot 26 with a reduced gap $g_2$ ($g_2 \leq g_1$) serving as the replacement of the gap $g_1$. Also, the magnetic member 34 includes a pair of magnetism collecting surfarces 40 on the two sides thereof as well as engaging portions 42 which are formed further outwardly of the magnetism collecting surfaces 40 integrally therewith and can be engaged with the respective umbrella portions 20 of the mutually adjoining salient poles 16.

The magnetic member 34 is a metal or resin molding having a magnetic property, while the outer peripheral surface 21 of each magnetism collecting surface 40 is so formed as to extend along the extension portion of the outer peripheral surface of its corresponding umbrella portion 20 and, together with the engaging portion 42, has a width substantially equal to the width of the armature core 10 in the axial direction thereof. On the other hand, the width of the curved portion 38 in the axial direction thereof is reduced over the width of the magnetism collecting surface 40 and engaging portion 42 to thereby form a narrow magnetic path, so that the independence of the magnetic poles can be made to stand out.

As will be described later, in the engaging portion 42, there may be formed a projecting portion 44 for positioning and this projecting portion 44 may be fitted with a recessed portion which is formed in the inner surface 20a of the umbrella portion 20. Also, in order to prevent the magnetic member 34 from moving and slipping off in the axial direction thereof, in the two end faces of the magnetic member 34 in the axial direction thereof, there maybe formed tongue piece portions 48 (they are shown by two-dot chained lines in FIG. 2) and may be turned down in such a manner that they can embrace or cover the width portions of the umbrella portions 20.

Alternatively, the outer end portion 50 of the engaging portion 42 may be contacted with the end portion 52 of an electric insulator 25 bonded to the open slot 26 side of the salient pole 16. Further, the magnetic member 34 may be formed of an elastic member or may be formed in such a manner that it is structurally elastic, and then such elastic magnetic member 34 may be mounted in the open slot 26 of the salient pole 16.

Although description has been given hereinbefore of one of the open slots 26 formed in the motor armature core 10, the remaining open slots 26 are structured similarly. That is, the magnetic resistance reducing means using the magnetic member 34 is not limited to the above-mentioned armature core 10 including three salient poles 16, but can be applied to all the armature cores that include a plurality of salient poles. Further, the present magnetic resistance reducing means can be applied to the armature core that is included in any one of a rotator, a stator, an inner rotor, and an outer rotor.

As described above, in a motor according to the invention into which the magnetic member 34 is mounted, when compared with the motor as shown in FIG. 8 (a) into which the magnetic member 34 is not mounted, the torque variations thereof measured completely at the same conditions except for the mounting of the magnetic member 34, as can be understood from a graphical representation shown in FIG. 8 (b), are smoothed while there disappear the six large variations due to the cogging shown in FIG. 8 (a).

The absolute value $|\Delta\tau_2|$ of a difference between the maximum value $\tau_{max.2}$ and minimum value $\tau_{min.2}$ measured here is 0.18 mN•m (mili-newton • meter), and the variation width thereof is ½ of the motor shown in FIG. 8 (a) into which the magnetic member 34 is not mounted, which shows that the present motor with the magnetic member 34 mounted therein is rotated more smoothly than the motor shown in FIG. 8 (a) accordingly. By the way, the graph of FIG. 8 (b) is shown completely with the same measure as that of FIG. 8 (a), in which the horizontal axis thereof expresses a rotation angle and the vertical axis thereof expresses a torque.

Figure 9A:
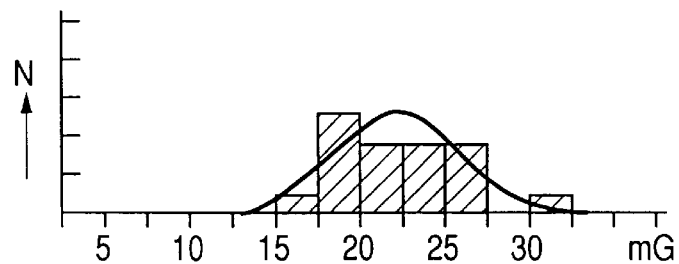
FIG. 9 is graphical representations of the results that are obtained in the form of measured vibrations when a motor according to the invention with a magnetic member mounted thereinto is compared with a conventional motor using a plurality of samples, in particular, FIG. 8 (a) is a histogram of the measured vibrations distribution of the conventional motor, and FIG. 8 (b) is a histogram of the measured vibrations distribution of the motor according to the invention with a magnetic member mounted thereinto.
Figure 9B:
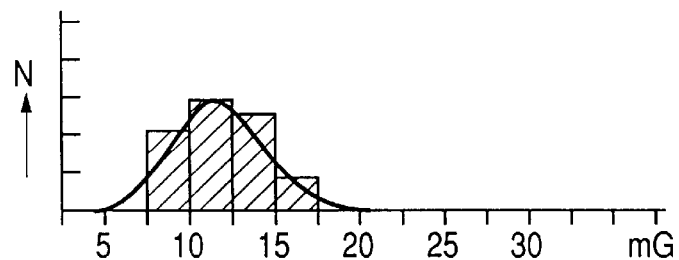
Figure 10:
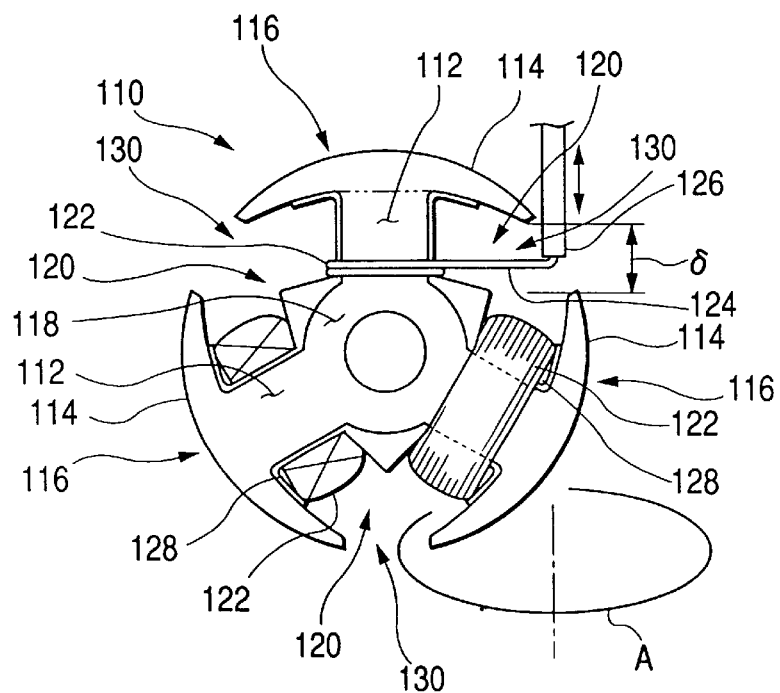
FIG. 10 is a typical view of an armature core, showing a conventional operation to wind a coil around the armature core.

Now, FIG. 9 (a) is a histogram of the vibrations of a drive device main body such as a CD (an optical disk) or the like measured when there are prepared 20 pcs. of motor samples A each with no magnetic member 34 mounted into the armature core 10 and the motor samples A are incorporated into the drive device main body, in which the horizontal axis of FIG. 9 (a) expresses the vibration values (mG or mili-G) of the individual samples and the vertical axis thereof expresses the vibration generation frequency (N).

And, FIG. 9 (b) is also a histogram of the vibrations of the drive device main body measured under the same conditions as FIG. 9 (a) with respect to 20 pcs. of motor samples B each with the magnetic member 34 mounted into the armature core 10. The mean value M1 of the vibrations of the samples A shown in FIG. 9 (a) is 22.000 mG, whereas the mean value M2 of the vibrations of the samples B shown in FIG. 9 (b) is 11.550 mG. This shows that the vibrations can be reduced down almost to a half when the magnetic member 34 is mounted into the armature core 10.

Also, due to the fact that the standard deviation value σ 2 (=2.523) of the samples B is smaller than the standard deviation value σ 1 (=3.539) of the samples A, it can be seen that the reproducibility of the samples B is enhanced and thus the samples B can provide products which are rather even in quality.

Now, description will be given below of the preferred embodiments of a magnetic member employed in the motor that has been described in the above-mentioned embodiment according to the invention with reference to the accompanying drawings. In the following drawings, like parts are given the same designations as in the above-mentioned embodiment. In particular, FIG. 3 (a) is a perspective view of a magnetic member 34a employed in a first embodiment, in which its relationship with respect to an umbrella portion 20 is shown by a virtual line.

Figure 3A:
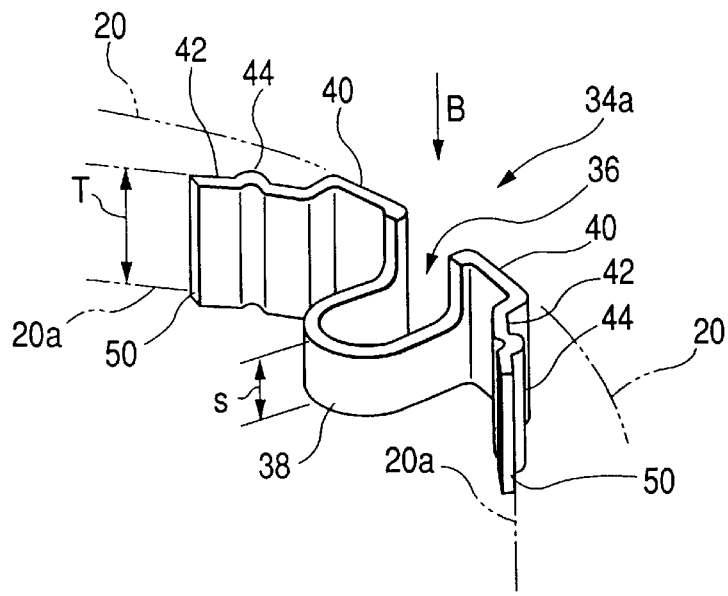
FIG. 3 is various views of a first embodiment of a magnetic member to be mounted into an open slot formed in a motor according to the invention; in particular, FIG. 3 (a) is a perspective view of the whole of the magnetic member as a single member, FIG. 3 (b) is a plan view thereof when viewed in a direction of an arrow B shown in FIG. 3 (a), and FIG. 3 (c) is a section view taken along the line C—C shown in FIG. 3 (b)
Figure 3B:
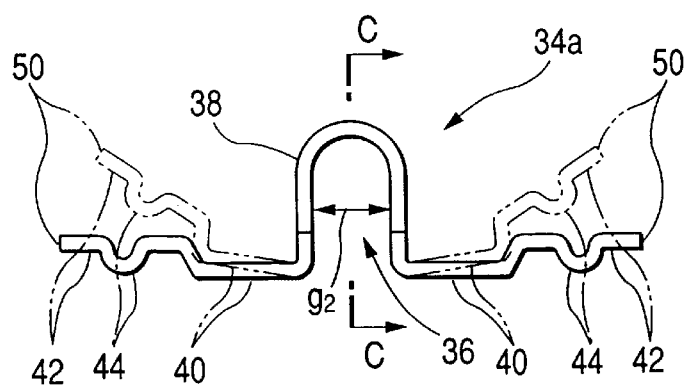
Figure 3C:
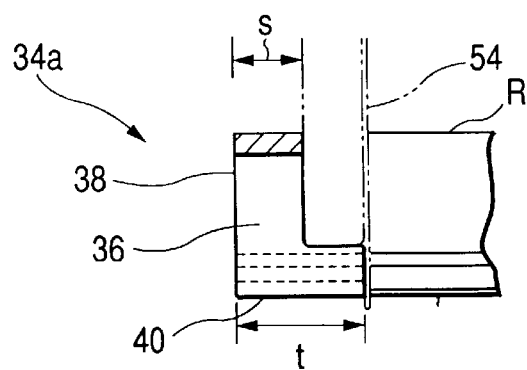

On the two sides of the magnetic member 34a, a pair of magnetism collecting surfaces 40 are so formed as to extend along the extension portions of the outer peripheral surfaces of the umbrella portions 20. In the central portion of the magnetic member 34a, there is formed a U-shaped curved portion 38 which defines a gap 36 serving as an opening. And, outside of the two magnetism collecting surfaces 40, there are formed integrally therewith two engaging portions 42 which are respectively used for engagement with the umbrella portions 20. The width t of the magnetism collecting surfaces 40 and engaging portions 42 is equal to the width T of the umbrella 20 in the longitudinal direction thereof, whereas the width s of the curved portion 38 is set smaller than the width t or T As the means for molding or forming the above-mentioned magnetic member 34a, there are employed means for press forming a magnetic iron plate, means for heating and compressing a magnetic resin plate, means for injecting magnetic molten resin into a forming metal mold, and the like. Or, alternatively, after a magnetic iron plate or magnetic resin material may be rolled by molded rollers or extruded by a die and is thereby continuously formed into a belt-like body having such a section as shown in FIG. 3 (b), the thus formed belt-like body may be then cut with a width t by at least one set of cutter arrays 54 shown by a two-dot chained line into separate members, that is, magnetism collecting surfaces 40 and engaging portions 42 may be cut formed in this manner and, at the same time, the curved portions 38 may be cut finished to a width s to thereby form it into a curved shape shown by a two-dot chained line in FIG. 3 (b). That is, those who are skilled in the art are easily able to enforce other various forming means. By the way, on the right side of FIG. 3 (c), a remaining portion which extends continuously with the cut portion of the belt-like body is shown by reference character R.

In the case of the magnetic member 34a which is molded out of the above plate material, the material thereof itself is elastic in structure as well and, therefore, the positions of the projecting portions 44 formed for positioning the engaging portions 42 can be determined by fitting the same with the recessed portions formed in the inside of the umbrella portions 20; however, in order to prevent the projecting portions 44 from slipping off out of position due to the vibrations thereof during rotation or other external factors, the projecting portions 44 may be positively fixed to the recessed portions 46 by adhesion.

Figure 4:
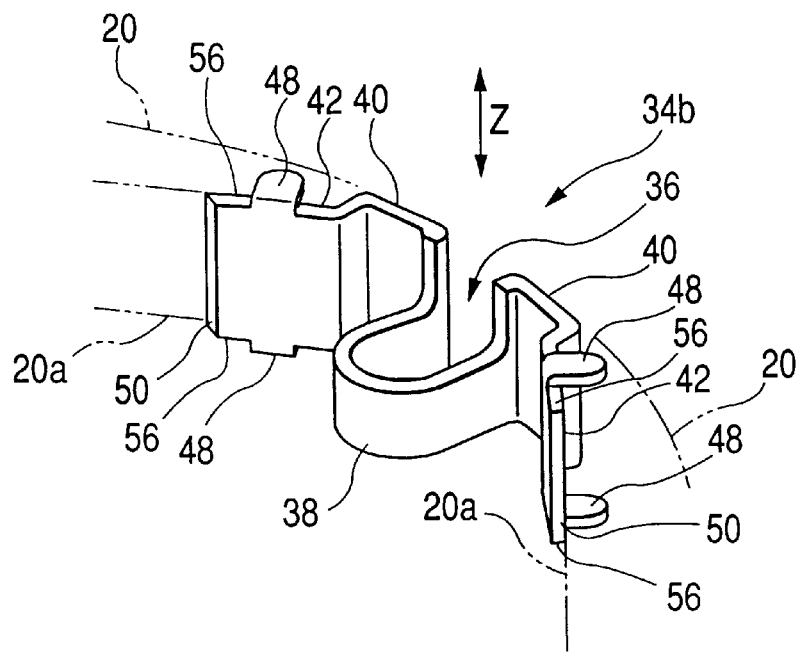
FIG. 4 is a perspective view of a second embodiment of a magnetic member to be mounted into an open slot formed in a motor according to the invention.

Now, FIG. 4 is a perspective view of a magnetic member 34b according to a second embodiment of the invention, in which its relationship with respect to the umbrella portions 20 is shown by virtual lines. The present magnetic member 34b is similar to the magnetic member 34a according to the first embodiment, except that, in order to prevent the magnetic member 34b from shifting in position in the axial direction thereof (in a direction of an arrow Z) and from slipping off, two tongue piece portions 48 are respectively provided on and projected from the two end faces 56 of the magnetic member 34b existing in the axial direction of the magnetic member 34b and are then turned up so as to embrace or cover the width portions of their corresponding umbrella portions 20. Thus, the description of the shape of the magnetic member 34b is omitted here. However, because of provision of the tongue piece portions 48, such forming means as in the magnetic member 34a according to the first embodiment, in which the continuous belt-like body is formed and cut into separate components, cannot be applied to the magnetic member 34b according to the second embodiment.

Figure 5:
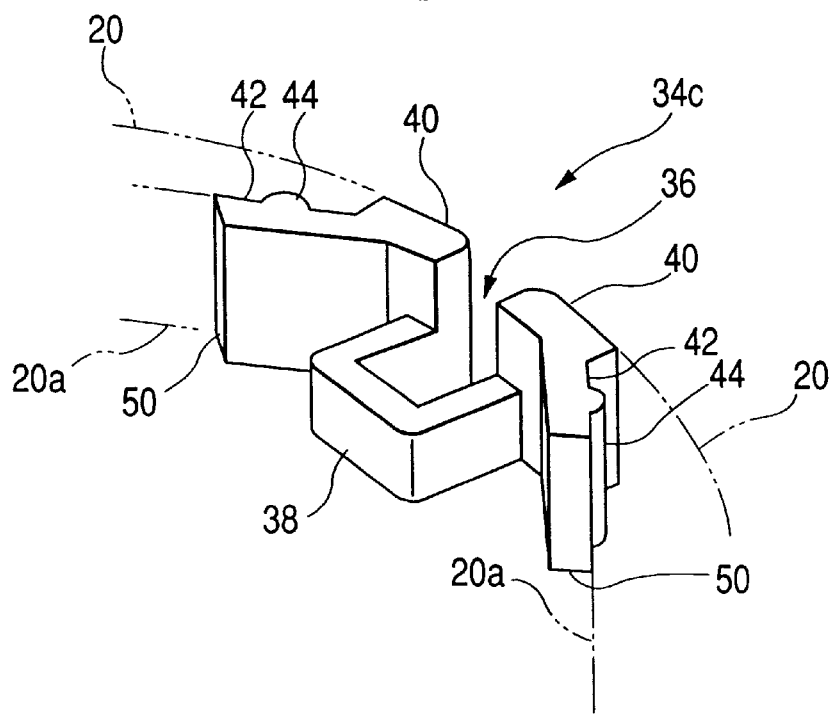
FIG. 5 is a perspective view of a third embodiment of a magnetic member to be mounted into an open slot formed in a motor according to the invention.

Now, FIG. 5 is a perspective view of a magnetic member 34c according to a third embodiment of the invention, in which its relationship with respect to the umbrella portions 20 is shown by virtual lines. The present magnetic member 34c is a molding which is molded out of magnetic resin and also in which a gap 36 is formed as a rectangular groove which is opening toward the outside. Since the present magnetic member 34c has no elasticity, it is impossible to insert the magnetic member 34c by use of the elasticity thereof. However, the magnetic member 34c can be molded using a metal die or separate components can be cut out from the belt-like continuous body. The remaining functions of the magnetic member 34c are similar to those of the magnetic member 34a according to the first embodiment, and thus the duplicate description thereof is omitted here.

Figure 6:
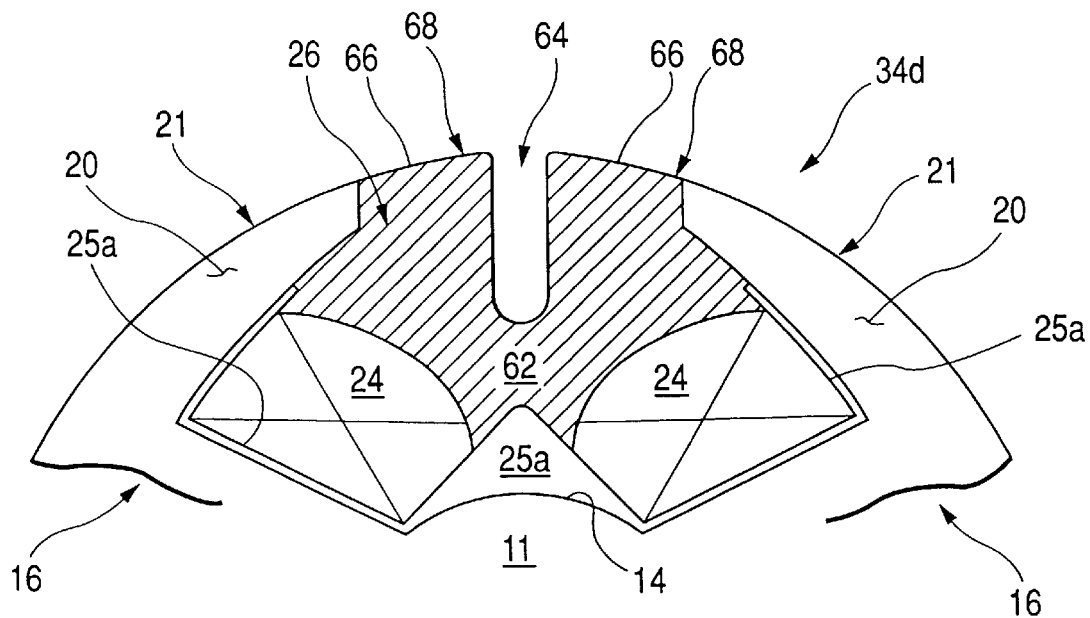
FIG. 6 is a perspective view of a fourth embodiment of a magnetic member to be mounted into an open slot formed in a motor according to the invention.

Now, FIG. 6 is an enlarged plan view of a magnetic member 34d and umbrella portions 20 according to a fourth embodiment of the invention. In the present magnetic member 34d, as shown in FIG. 6, after the winding operation of a coil 24 into an open slot 26 is completed, magnetic resin 62 is insert molded into the open slot 26. The magnetic member 34d further includes a gap portion 64, two magnetism collecting surfarces 66, and two magnetism collecting surfaces 68 which are respectively formed in the extension portions of the outer peripheral surfaces of the umbrella portions 20. Reference character 25a designates an electric insulator. The functions of the gap portion 64 and two magnetism collecting surfaces 66 are similar to those of the gap portion 36 and magnetism collection portions 40 according to the first to third embodiments, and thus the description thereof is omitted here. At any rate, the fourth embodiment is quite similar to the previously described first to third embodiments in the basic concept that the magnetism collecting surfarces 44 and 66 having small magnetic resistance are expanded to thereby be able to reduce the gaps 36, 64 which cause factors in the cogging.

Figure 7:
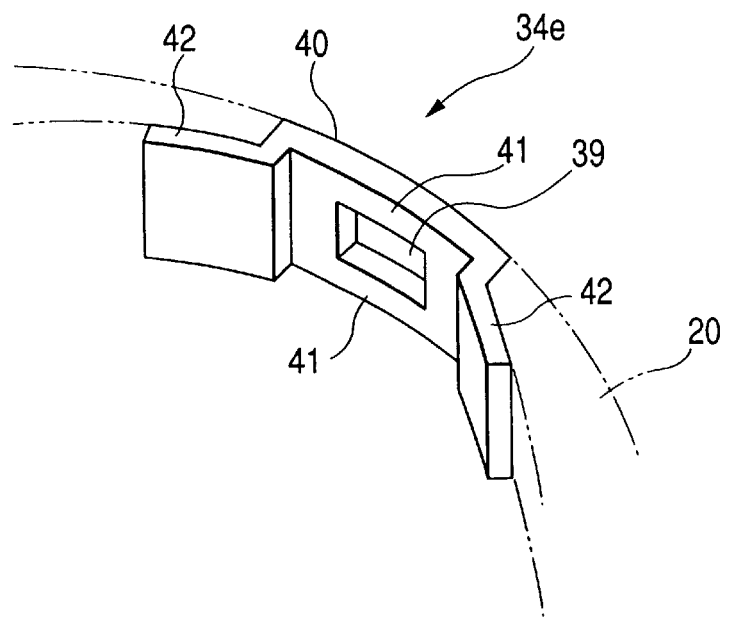
FIG. 7 is a perspective view of a fifth embodiment of a magnetic member to be mounted into an open slot formed in a motor according to the invention.

Now, FIG. 7 is a perspective view of a magnetic member 34e according to a fifth embodiment of the invention, in which its relationship with respect to the umbrella portions 20 is shown by virtual lines. The present magnetic member 34e includes, in the magnetism collecting surface 40 thereof, a through hole 39 serving as an opening. And, on the two end portions of the through hole 39 in the axial direction thereof, there are respectively formed connecting portions 41 and 41 having a width of ½ s. The through hole 39 and connecting portions 41, 41 respectively correspond to the-gap portion 36 and curved portion 38 in the first to third embodiments. That is, due to provision of the through hole 39 and connecting portions 41, 41, the magnetic member 34e can be engaged with the umbrella portions 20 with elasticity equivalent to the elasticity that is generated in the curved portion 38; and, by setting the width of the connecting portions 41, 41 for ½ s×2 instead of the width s of the curved portion 38 and also by forming the through hole 39, the independence of the mutually adjoining magnetic poles can be enhanced. By the way, the shape of the through hole 39 is not limited to such a square as shown in FIG. 7, but it may have any other shape than the square shape such as a polygonal or elliptical shape.

Although the preferred embodiments of the invention have been illustrated and disclosed heretofore, the invention is not limited to them but it is obvious that any person who is skilled in the art is able to combine the armature core and magnetic member with each other in various manners or reconstruct them, or change or modify the shapes thereof properly as the need arises.

For example, in the above-mentioned respective embodiments, the outer peripheral surface of the umbrella portion of the salient pole of the armature core is formed as an even and flat peripheral surface. However, in order to reduce the cogging, uneven portions corresponding to the magnetic pole pitches of the field magnet may be formed in the outer peripheral surface of the umbrella portion. Further, in correspondence to the last-proposed structure, similar uneven portions may be formed in the magnetism collecting surface of the magnetism collecting member as well, thereby reducing the cogging.

As has been described hereinbefore, with use of a motor according to the invention, since the magnetic member is mounted into the open slot to thereby narrow the substantial gap between the salient poles, the cogging and vibrations can be reduced.

Also, in the gap portion which is formed in the central portion of the present magnetic member, the magnetism collecting surfarces on the two sides of the present gap portion are bridgingly connected together to thereby complete a magnetic circuit, so that the short circuit of the magnetic circuit can be restricted and thus the lowering of the motor efficiency can be prevented. Further, since the open slot can be widened in the armature core before the magnetic member is mounted into the armature core, the coil winding control range can be expanded, so that the occupation rate of the volume of the coil wound is enhanced and thus the motor efficiency can be improved.

Still further, according to the motor of the invention, since the uneven quality of the products with respect to vibrations can be reduced, it is easy to select the property of the motor with respect to other peripheral members such as an anti-vibration member and the like which can be combined with the motor as the need arises.

What is claimed is:

1. A motor, comprising:

an armature core including a plurality of salient poles and a plurality of open slots respectively formed between the mutually adjoining ones of said salient poles, each of said salient poles including an arm portion projecting radially from the central portion of said armature core and an umbrella portion formed at the outer end portion of said arm portion so as to extend to both sides of the circumferential direction thereof;

a coil wound around said arm portion of each of said salient poles;

a plurality of field magnets opposed to the outer peripheral surface of said umbrella portion;

a magnetic member fitted into each said plurality of open slots, said magnetic member including a magnetism collection portion containing therein a magnetism collecting surface corresponding to the extension portion of said outer peripheral surface of said umbrella portion and said magnetism collecting portion is directly engaged with adjacent umbrella portions by attaching means; and an opening formed in the central portion of said magnetism collecting surface, wherein one of said armature core and said field magnet rotates with respect to the other.

2. A motor as set forth in claim 1, wherein said magnetic member includes another magnetism collecting portion containing therein a magnetism collecting surface corresponding to the extension portion of said outer peripheral surface of said umbrella portion, and wherein a gap portion is formed between said magnetism collecting surfaces and serving as said opening.

3. A motor as set forth in claim 2, wherein said magnetic member includes a curved portion curved in said open slot while extending in the radial direction of said armature core to form said gap portion and to connect said magnetism collecting surfaces to each other, and engaging portions respectively extending in the peripheral direction of said armature core from the respective outer ends of said magnetism collecting surfarces and engageable with said salient pole.

4. A motor as set forth in claim 3, wherein the width of said curved portion in the axial direction of said motor is formed smaller than the thickness of said armature core in said axial direction.

5. A motor as set forth in claim 3, wherein each of said engaging portions includes a tongue piece portion for covering the axial end face of said umbrella portion of said salient pole.

6. A motor as set forth in claim 1, wherein said opening is defined by a groove which is opened radially outwardly.

7. A motor as set forth in claim 6, wherein the width of said magnetism collecting portion in a direction parallel to the longitudinal axis of said core is substantially the same as the width of said core.

8. A motor as set forth in claim 7, wherein a width of said central portion of said magnetism collecting surface having said opening is less than the width of said magnetism collecting portion to define a narrow magnetic path.

9. A motor comprising:

an armature core including a plurality of salient poles and a plurality of open slots respectively formed between the mutually adjoining ones of said salient poles, each of said salient poles including an arm portion projecting radially from the central portion of said armature core and an umbrella portion formed at the outer end portion of said arm portion so as to extend to both sides of the circumferential direction thereof;

a coil wound around said arm portion of each of said salient poles;

a plurality of field magnets opposed to the outer peripheral surface of said umbrella portion;

a magnetic member fitted into each said plurality of open slots, said magnetic member including a magnetism collecting portion containing therein a magnetism collecting surface corresponding to the extension portion of said outer peripheral surface of said umbrella portion; and an opening formed in the central portion of said magnetism collecting surface, said opening being defined by a groove which is open radially outwardly, wherein one of said armature core and said field magnet rotates with respect to the other; and wherein said magnetic member is formed of an elastic member and is elastically engaged with said umbrella portion of said salient pole.

10. A motor as set forth in claim 9, wherein said magnetic member includes another magnetism collecting portion containing therein a magnetism collecting surface corresponding to the extension portion of said outer peripheral surface of said umbrella portion, and wherein a gap portion is formed between said magnetism collecting surfaces and serving as said opening.

11. A motor as set forth in claim 10, wherein said magnetic member includes a curved portion curved in said open slot while extending in the radial direction of said armature core to form said gap portion and to connect said magnetism collecting surfaces to each other.

12. A motor as set forth in claim 11, wherein the width of said curved portion in the axial direction of said motor is formed smaller than the thickness of said armature core in said axial direction.

13. A motor as set forth in claim 11, wherein each of said engaging portions includes a tongue piece portion for covering the axial end face of said umbrella portion of said salient pole.

14. A motor, comprising:

an armature core including a plurality of salient poles and a plurality of open slots respectively formed between the mutually adjoining ones of said salient poles, each of said salient poles including an arm portion projecting radially from the central portion of said armature core and an umbrella portion formed at the outer end portion of said arm portion so as to extend to both sides of the circumferential direction thereof;

a coil wound around said arm portion of each of said salient poles;

a plurality of field magnets opposed to the outer peripheral surface of said umbrella portion;

a magnetic member fitted into each said plurality of open slots, said magnetic member including a magnetism collecting portion containing therein a magnetism collecting surface corresponding to the extension portion of said outer peripheral surface of said umbrella portion; and an opening formed in the central portion of said magnetism collecting surface, said opening being defined by a groove which is open radially outwardly, wherein one of said armature core and said field magnet rotates with respect to the other;

wherein said magnetic member includes another magnetism collecting portion containing therein a magnetism collecting surface corresponding to the extension portion of said outer peripheral surface of said umbrella portion, and wherein a gap portion is formed between said magnetism collecting surfaces and serving as said opening.

15. A motor, comprising:

an armature core including a plurality of salient poles and a plurality of open slots respectively formed between the mutually adjoining ones of said salient poles, each of said salient poles including an arm portion projecting radially from the central portion of said armature core and an umbrella portion formed at the outer end portion of said arm portion so as to extend to both sides of the circumferential direction thereof;

a coil wound around said arm portion of each of said salient poles;

a plurality of field magnets opposed to the outer peripheral surface of said umbrella portion;

a magnetic member fitted into each said plurality of open slots, said magnetic member including a magnetism collecting portion containing therein a magnetism collecting surface corresponding to the extension portion of said outer peripheral surface of said umbrella portion; and an opening formed in the central portion of said magnetism collecting surface, said opening being defined by a groove which is open radially outwardly, wherein one of said armature core and said field magnet rotates with respect to the other; and wherein said opening is defined by a groove which is opened radially outwardly.

* * * * *